(12) United States Patent
Wang (10) Patent No.: US 8,403,005 B2
(45) Date of Patent: Mar. 26, 2013

(54) ROTARY PULLING TAP

(75) Inventor: Ruifu Wang, Shen Zen (CN)

(73) Assignee: Globe Union Industrial Corp., Taichung (TW)

( * ) Notice: Subject to any disclaimer, the term of this patent is extended or adjusted under 35 U.S.C. 154(b) by 408 days.

(21) Appl. No.: 12/613,300

(22) Filed: Nov. 5, 2009

(65) Prior Publication Data

US 2011/0100494 A1   May 5, 2011

(51) Int. Cl.
*F15B 13/00* (2006.01)
*F16K 11/087* (2006.01)
*E03B 1/00* (2006.01)
*E03B 3/00* (2006.01)
*F16L 27/00* (2006.01)

(52) U.S. Cl. ........................................ 137/801; 137/580
(58) Field of Classification Search .................. 137/580, 137/625.41, 801; 403/164
See application file for complete search history.

(56) References Cited

U.S. PATENT DOCUMENTS

| | | | | |
|---|---|---|---|---|
| 4,262,699 A * | 4/1981 | Fabian | ........................... | 137/801 |
| 4,706,709 A * | 11/1987 | Monch | ........................... | 137/597 |
| 4,995,121 A * | 2/1991 | Barker | ............................... | 4/443 |
| 6,079,447 A * | 6/2000 | Holzheimer et al. | .......... | 137/801 |
| 6,135,151 A * | 10/2000 | Bowers et al. | ........... | 137/625.17 |
| 6,328,067 B1 * | 12/2001 | Hsiung | ........................... | 137/615 |
| 6,802,335 B2 * | 10/2004 | Jones et al. | .............. | 137/315.15 |
| 7,191,475 B1 * | 3/2007 | Marcotte | ............................ | 4/567 |
| 2003/0102256 A1 * | 6/2003 | Takagi | ........................... | 210/101 |
| 2007/0144593 A1 * | 6/2007 | Egli | ............................ | 137/625.41 |
| 2009/0208274 A1 * | 8/2009 | Liang | ............................ | 403/164 |

* cited by examiner

Primary Examiner — John Rivell
Assistant Examiner — Hailey K Do (57) ABSTRACT

A single-levered rotary pulling tap is used in the kitchen and includes a tap body, a spraying head, a control valve set, a first flowing assembly, and a second flowing assembly used to rotate relative to the first flowing assembly at a predetermined angular range so that user can adjustably move the spraying head to a desired position based on demand, and the pulling tap is operated smoothly to prevent from wearing related parts of the single-levered rotary pulling tap, such as the first flowing assembly, the second flowing assembly, and the control valve set, prolonging service life of the single-levered rotary pulling tap.

10 Claims, 11 Drawing Sheets

ROTARY PULLING TAP

BACKGROUND OF THE INVENTION

1. Field of the Invention

The present invention relates to a single-levered rotary pulling tap.

2. Description of the Prior Art

A double-levered pulling tap disclosed in US Pub. No. 20080223454A1 includes a base having a spraying hose connected thereon, a middle part, and a cold-water control valve and a hot-water control valve disposed on two opposite sides thereof, user can control flowing amount flowing to the middle part by using a lever on the cold-water and the hot-water control valves. A spraying head is installed to the spraying hose having a base and a neck portion, and between the middle part and the pulling spraying head are defined a flexible tube having a loading block so that water flowing form the middle part flows to the spraying head via the flexible tube, and after the spraying head is pulled outward, it retracts automatically to an original position by using the loading block of the flexible tube, thereby enabling to move the spraying head toward a desired position based on demand.

Because the double-levered pulling tap is additionally provided with a spraying hose having a rotary base, user can rotate the spraying hose to actuate the spraying head to move so as to make water flow toward a desired position without pulling the spraying head every time. For example, when the user fixes an object with one hand and then washes the object with another hand, the spraying head is not pulled outward, hence having flexible operation based on different demand.

Conventional single-levered pulling tap includes a tap body having a cold-water and hot-water control valve operated to flow water by using a single lever. However, such a conventional single-levered pulling tap, especially having an obliquely pulled spraying head fixed therein, does not include a spraying hose as above-mentioned double-levered pulling tap, therefore the obliquely pulled spraying head can not be moved to a desired position on the basis of requirement.

The present invention has arisen to mitigate and/or obviate the afore-described disadvantages.

SUMMARY OF THE INVENTION

The primary object of the present invention is to provide a rotary pulling tap in a single-levered and obliquely pulled spraying head design which can adjustably move the spraying head toward a desired position based on demand, and is operated smoothly to prevent from wearing related parts of the rotary pulling tap, prolonging service life of the rotary pulling tap.

A single-levered rotary pulling tap according to a preferred embodiment of the present invention comprises a base fixed to a platform;

a tap body including an internal space to communicate with an inlet rotably installed to the base, an outlet, and an opening;

a spraying head movably installed to the outlet of the tap body to be pulled outward and retracted backward;

a control valve set including a sleeve to be fixed to the opening of the tap body, a valve core limited in the sleeve to rotate and including an internal passageway, and a lever to rotate the valve core;

a first flowing assembly located in the tap body and including a seat and a column portion, the seat including a cold-water inflow channel, a hot-water inflow channel, and a passage, respectively having a cold-water coupling aperture, a hot-water coupling aperture, and a mouth arranged on a bottom end of the column portion, and individually having a cold-water orifice, a hot-water orifice, and an exit fixed on an outer wall of the column portion;

a second flowing assembly located in the tap body and including a securing segment to couple with the sleeve of the control valve set and a bush segment movably fitted with the column portion of the first flowing assembly so as to rotate in relation to the column portion, the second flowing assembly including a cold-water inflow channel, a hot-water inflow channel and a passage, respectively having a cold-water vent, a hot-water ventilation, and an intake arranged on an end surface of the securing segment, and respectively having a cold-water orifice, a hot-water orifice, and an exit formed on an inner wall of the bush segment, on the inner wall of the bush segment being vertically provided a first slot, a second slot, and a third slot in order relative to the first, the second, and the third slots of the column portion of the first flowing assembly; and the cold-water orifice, the hot-water orifice, and the exit being located at the third, the second, and the first slots individually;

an axial defining means located between the column portion of the first flowing assembly and the bush segment of the second flowing assembly so that the bush segment is axially limited to rotate on the column portion;

a circumferential defining means to limit the tap body to rotate within a predetermined angular range relative to the base;

a piping set including a cold-water receiving piping to connect with the cold-water coupling aperture of the first flowing assembly, a hot-water receiving piping to couple with the hot-water coupling aperture of the first flowing assembly, an outflow piping to connect with the mouth of the first flowing assembly, and a flexile hose, two ends of which couple with the spraying head 30 and the outflow piping individually.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
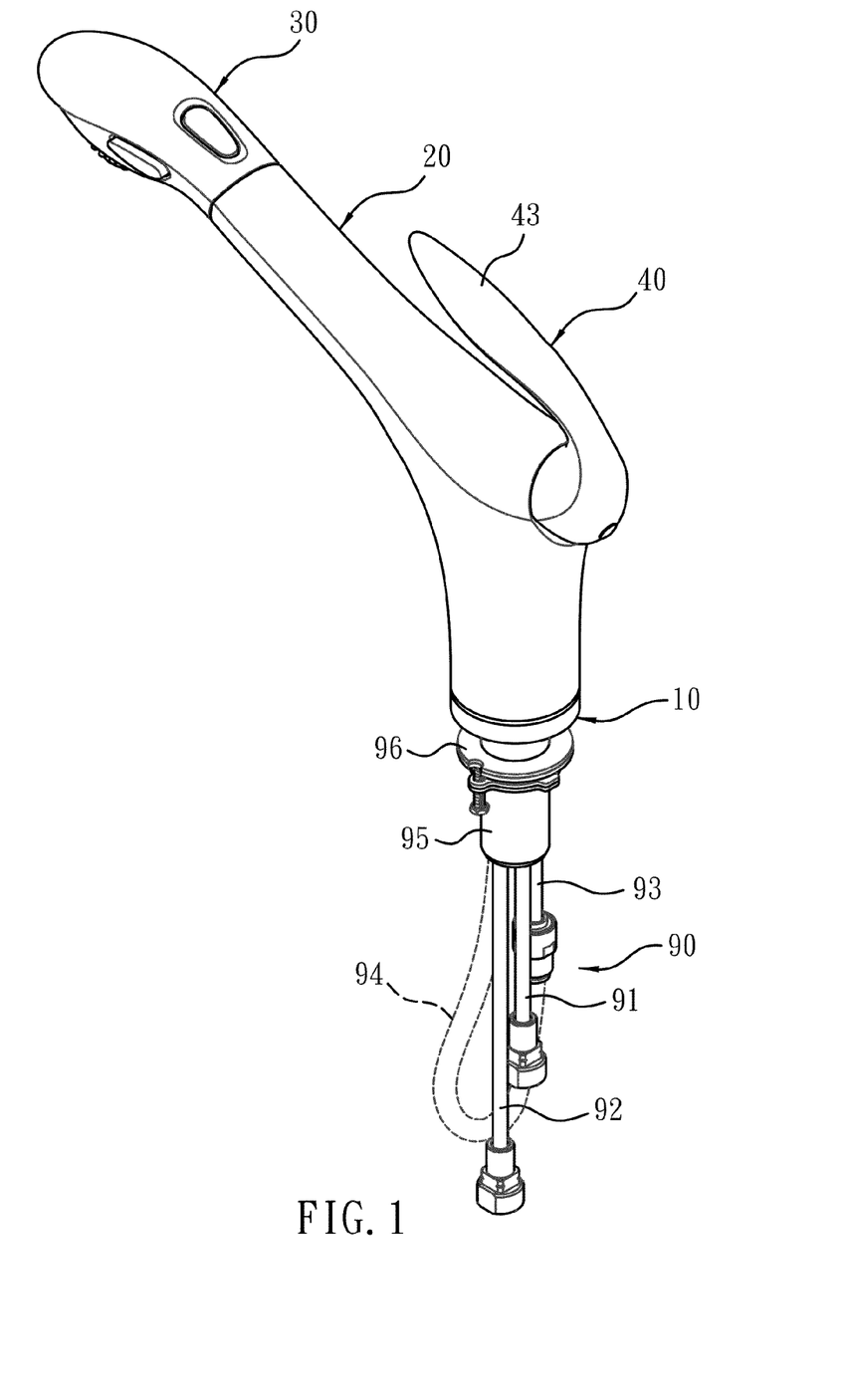
FIG. 1 is a perspective view showing the assembly of a single-levered rotary pulling tap in accordance with a preferred embodiment of the present invention.

Referring to FIG. 1, a single-levered rotary pulling tap in accordance with a preferred embodiment of the present invention is used in kitchen and comprises a base 10, a tap body 20, a spraying head 30, a control valve set 40, a first flowing assembly 50, a second flowing assembly 60, an axial defining means 70, a circumferential defining means 80, and a piping set 90.

Figure 4:
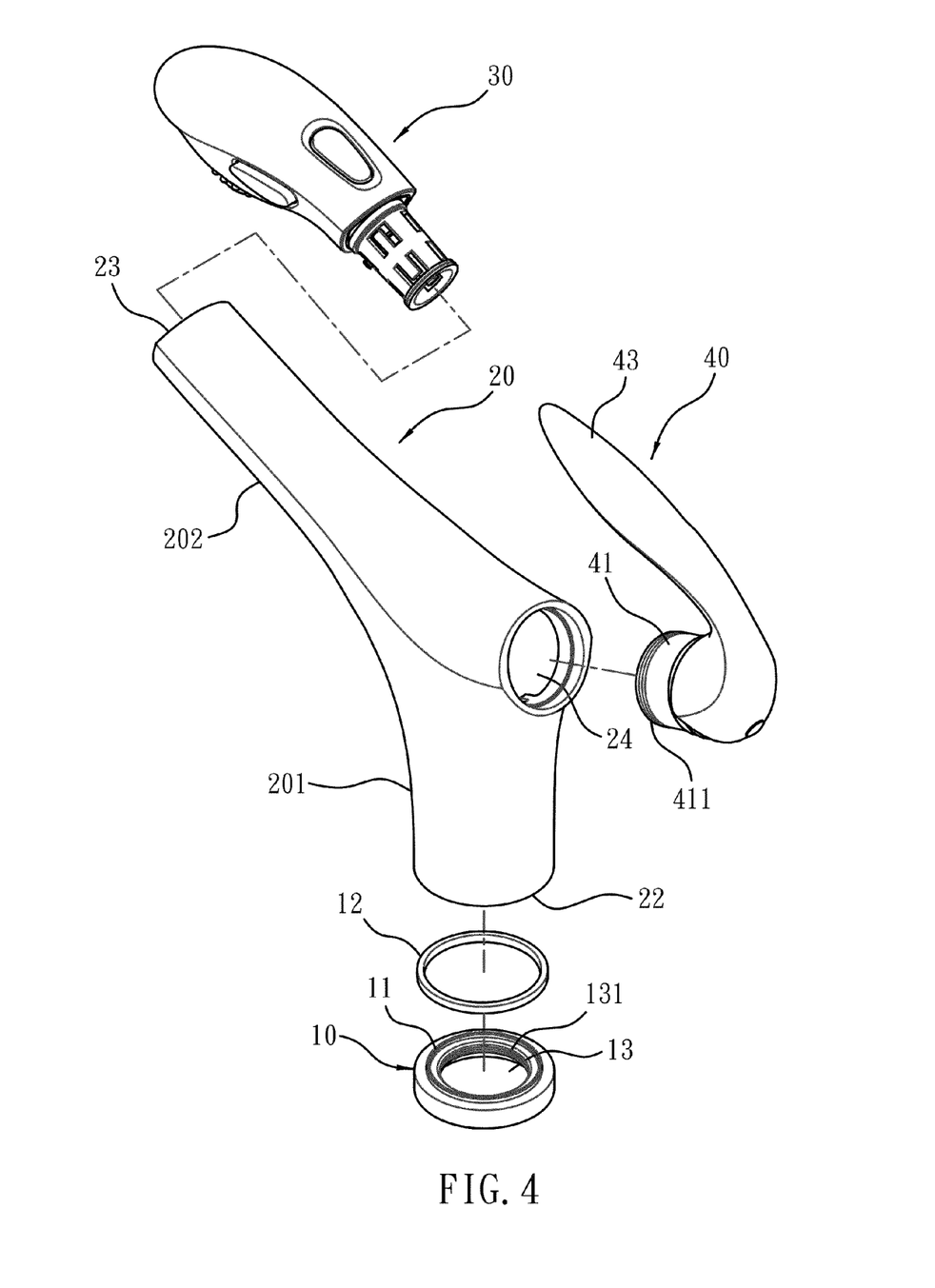
FIG. 4 is a perspective view showing partial exploded components of the single-levered rotary pulling tap in accordance with the preferred embodiment of the present invention.

The base 10 as shown in FIG. 4 is installed on a platform beside a water tank in the kitchen, and includes a positioning rim 11 disposed on a top surface thereof and having a plastic ring 12 fixed on an outer wall of the positioning rim 11, and the base 10 is formed in a loop shape and includes a through hole 13 formed at a central portion thereof, the through hole 13 includes inner screws 131 arranged therein.

Figure 2:
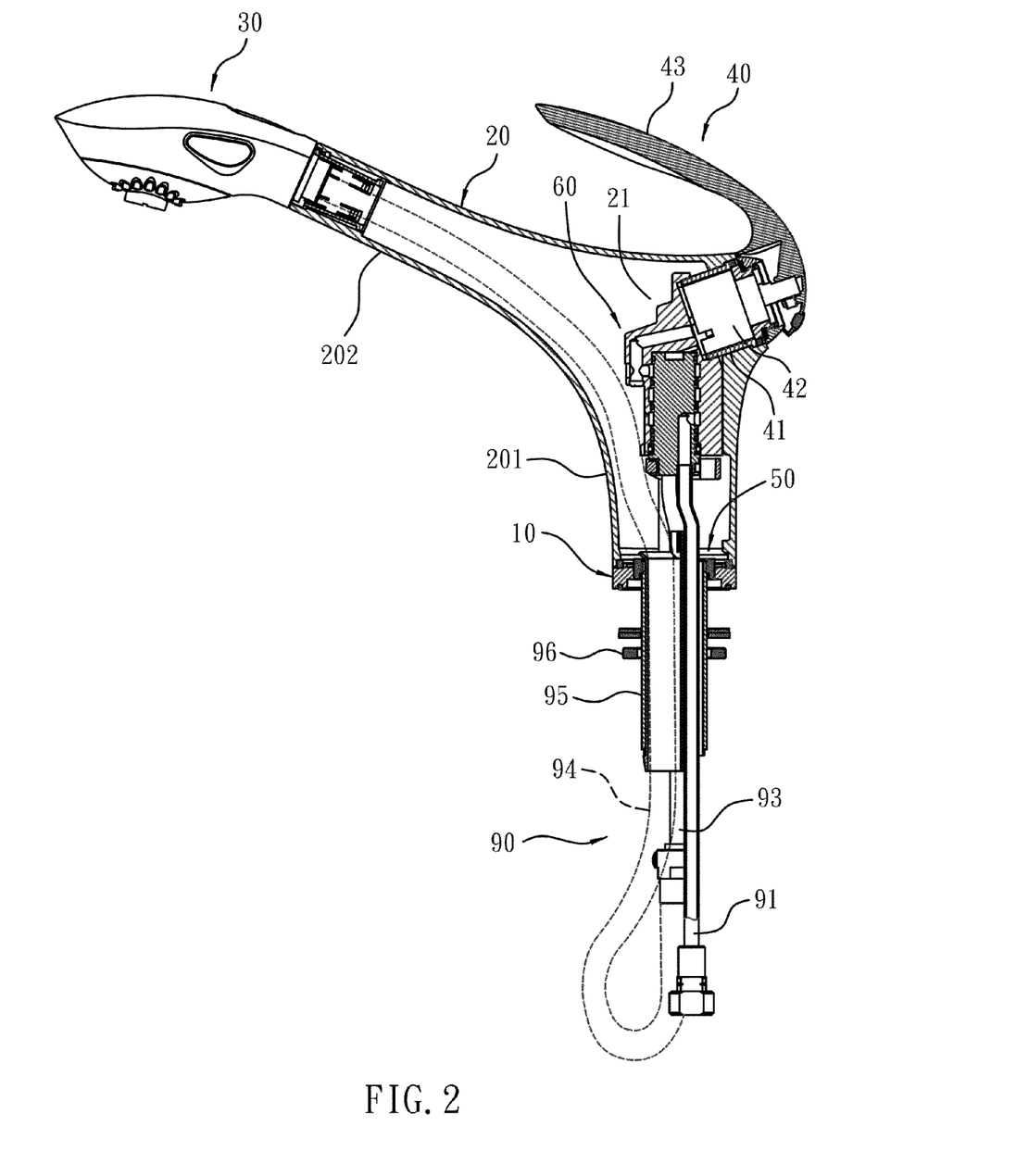
FIG. 2 is a cross sectional view showing the assembly of the single-levered rotary pulling tap in accordance with the preferred embodiment of the present invention.

The tap body 20 as illustrated in FIGS. 2 and 4 is formed in a housing shape, and includes a vertical portion 201 and an extending portion 202, both of which are integrally formed, and the tap body 20 includes an internal space 21 defined therein to communicate with an inlet 22 located at the vertical portion 201, an outlet 23 located at a distal end of the extending portion 202, and an opening 24 located on one side of a top end of the vertical portion 201, and the tap body 20 is rotably installed to the base 10.

Figure 6:
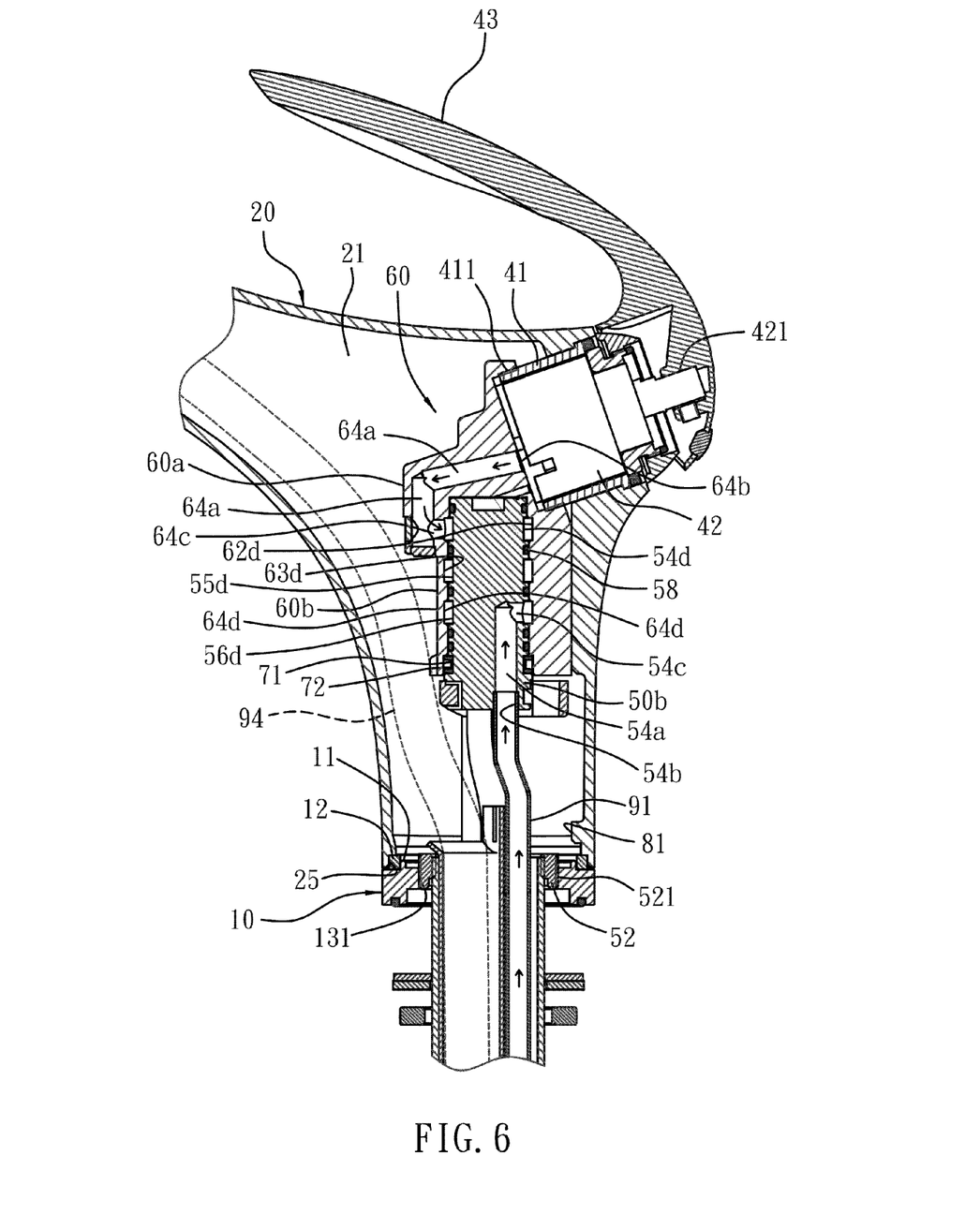
FIG. 6 is a partial amplified view of FIG. 2 and the operation of the single-levered rotary pulling tap in accordance with the preferred embodiment of the present invention.

The inlet 22 of the tap body 20 includes a retaining groove 25 disposed on an edge thereof to engage with the plastic ring 12 of the base 10 as illustrated in FIGS. 4 and 6 so as to obtain smooth sliding and anti-wear functions, hence the tap body 20 can smoothly rotate on the base 10.

The spraying head 30 as shown in FIGS. 1, 2, and 4, is movably installed on the outlet 23 of the tap body 20 to be pulled outward and retracted backward.

The control valve assembly 40 as shown in FIGS. 4 and 6 includes a sleeve 41, a valve core 42 defined in the sleeve 41 to rotate, and a coupling portion 421 extending on an outer side of the valve core 42 to rotate a lever 43 of the valve core 42, wherein the sleeve 41 is inserted to the opening 24 of the tap body 20 to be retained, and includes outer screws 411 formed on an external side thereof.

The valve core 42 of the control valve assembly 40 includes an inner passageway arranged therein, therefore when the valve core 42 is rotably positioned at a predetermined angle, one or both of cold and hot waters flows into the inner passageway at a suitable flowing amount, and then a water flow (such as cold water, hot water, or combined cold and hot water) flows out of the inner passageway. Because the inner passageway is a well-known art, further remark is omitted.

Figure 8:
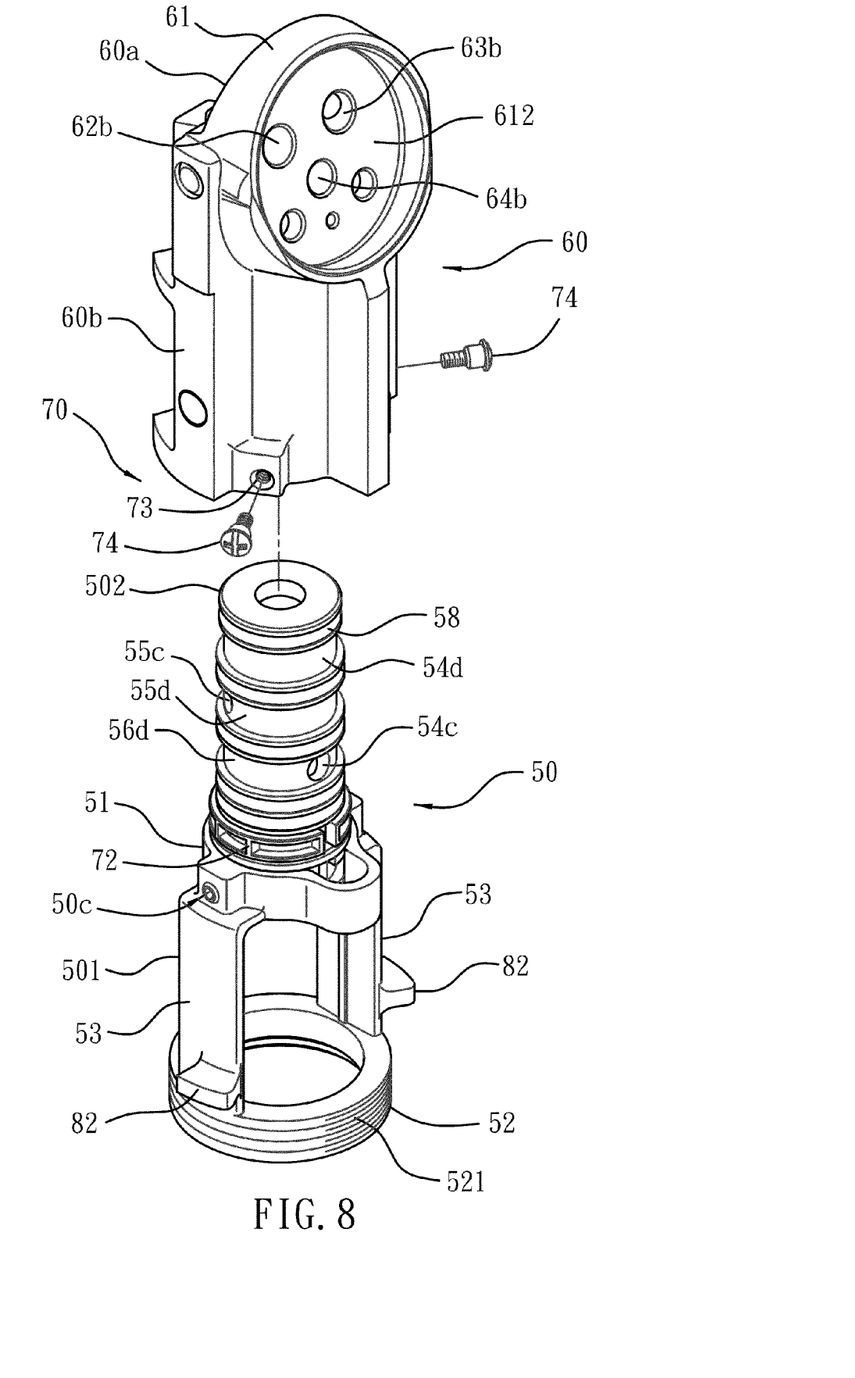
FIG. 8 is a perspective view showing the exploded components of the first flowing assembly and the second flowing assembly of the single-levered rotary pulling tap in accordance with the preferred embodiment of the present invention.
Figure 9:
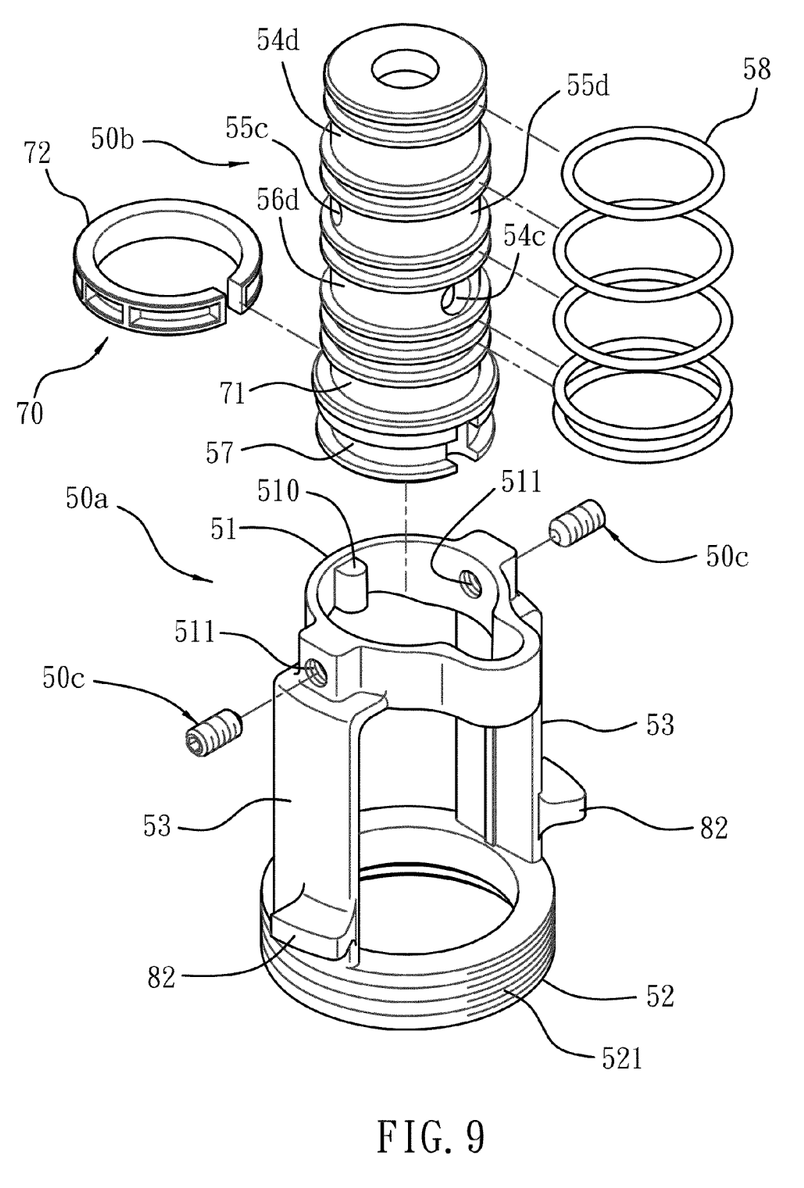
FIG. 9 is a perspective view showing the exploded components of the first flowing assembly of the rotary pulling tap in accordance with the preferred embodiment of the present invention.
Figure 10:
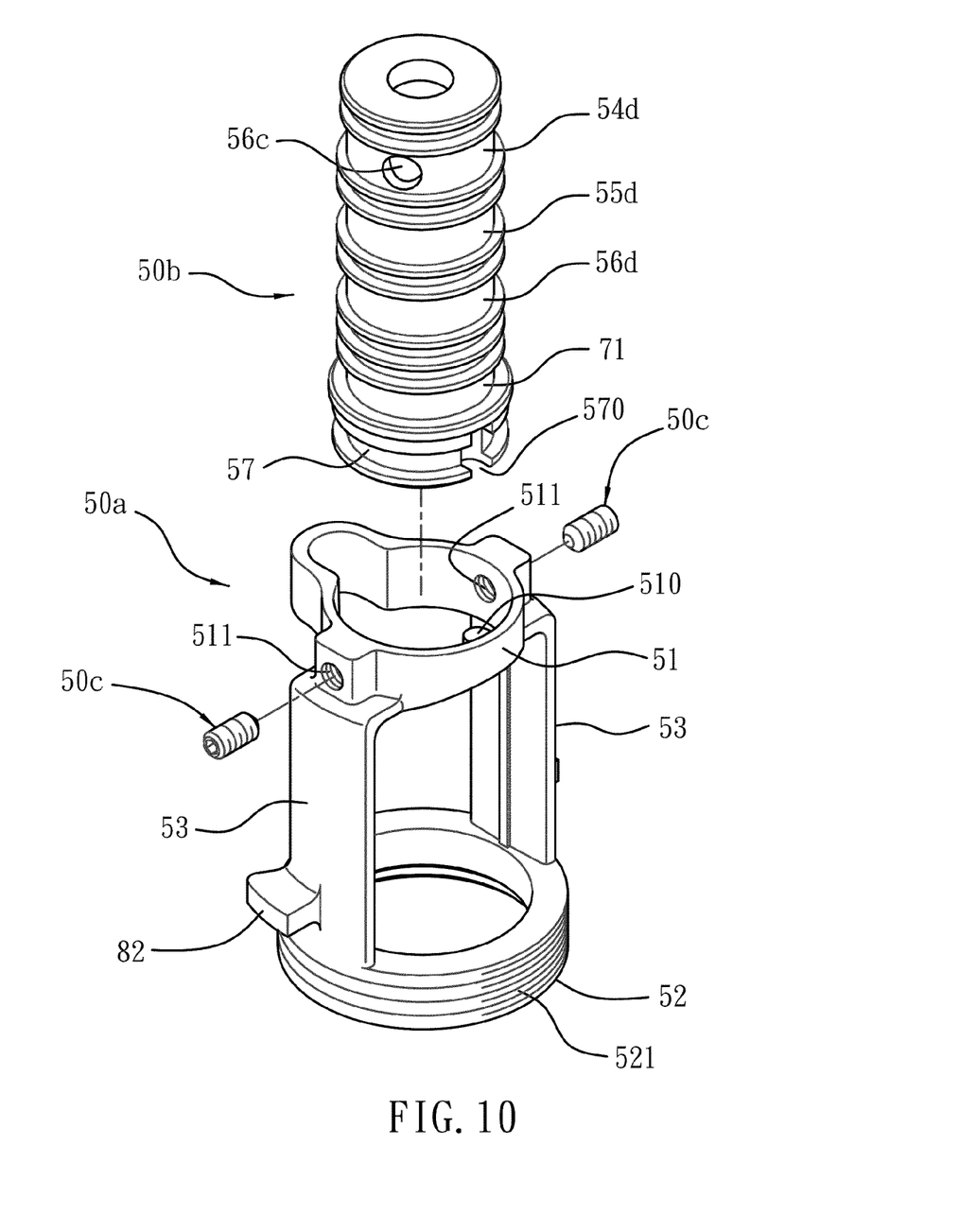
FIG. 10 is a perspective view showing partial exploded components of the first flowing assembly of the single-levered rotary pulling tap in accordance with the preferred embodiment of the present invention.

The first flowing assembly 50 as illustrated in FIGS. 8-10 is located at the internal space 21 of the vertical portion 201 of the tap body 20 and includes a seat 50a, a shaft member 50b, and two bolt members 50c, wherein the seat 50a is locked with the shaft member 50b by using the bolt members 50c, such that the assembled seat 50a is formed a holder 501, and the assembled shaft member 50b is formed a column portion 502.

The seat 50a includes a fitting member 51 disposed on a top end thereof, a fixing loop 52 mounted on a bottom end thereof, and two connecting ribs 53 defined between the fitting member 51 and the fixing loop 52; the fitting member 51 includes a limiting block 510 extending from an inner wall thereof; the fixing loop 52 includes outer threads 521 arranged thereon to screw with the inner screws 131 of the through hole 13 of the base 10.

The fitting member 51 includes two bores 511 fixed on an outer wall thereof in relation to the connecting ribs 53 to screw the bolt members 50 c inward.

The connecting ribs 53 are spaced 120 degrees apart from each other. The shaft member 50b is formed in a shaft shape and includes a cold-water inflow channel 54a, a hot-water inflow channel 55a, and a passage 56a, respectively having a cold-water coupling aperture 54b, a hot-water coupling aperture 55b, a mouth 56b arranged on a bottom end of the shaft member 50b, and individually having a cold-water orifice 54c, a hot-water orifice 55c, and an exit 56c fixed on an outer wall of the shaft member 50b.

The shaft member 50b includes a first slot 54d, a second slot 55d, a third slot 56d, and an annular recess 57 vertically arranged on an outer wall thereof in order; the cold-water orifice 54c, the hot-water orifice 55c, and the exit 56c are located at the third slot 55d, the second slot 56d, and the first slot 54d individually. Between the outer wall and two sides of the shaft member 50b is defined at least one sealing member 58, such as an O-ring. The shaft member 50b includes a longitudinal trench 570 disposed on a bottom side of the outer wall thereof to pass through the annular recess 57, and a bottom end of the shaft member 50b is inserted to the fitting member 51 of the seat 50a so that the limiting block 510 of the fitting member 51 engages with the trench 570 of the shaft member 50b, and the bolt members 50c of the fitting member 51 are screwed to the annular recess 57, thereby assembling the seat 50a and the shaft member 50b together securely.

Figure 7:
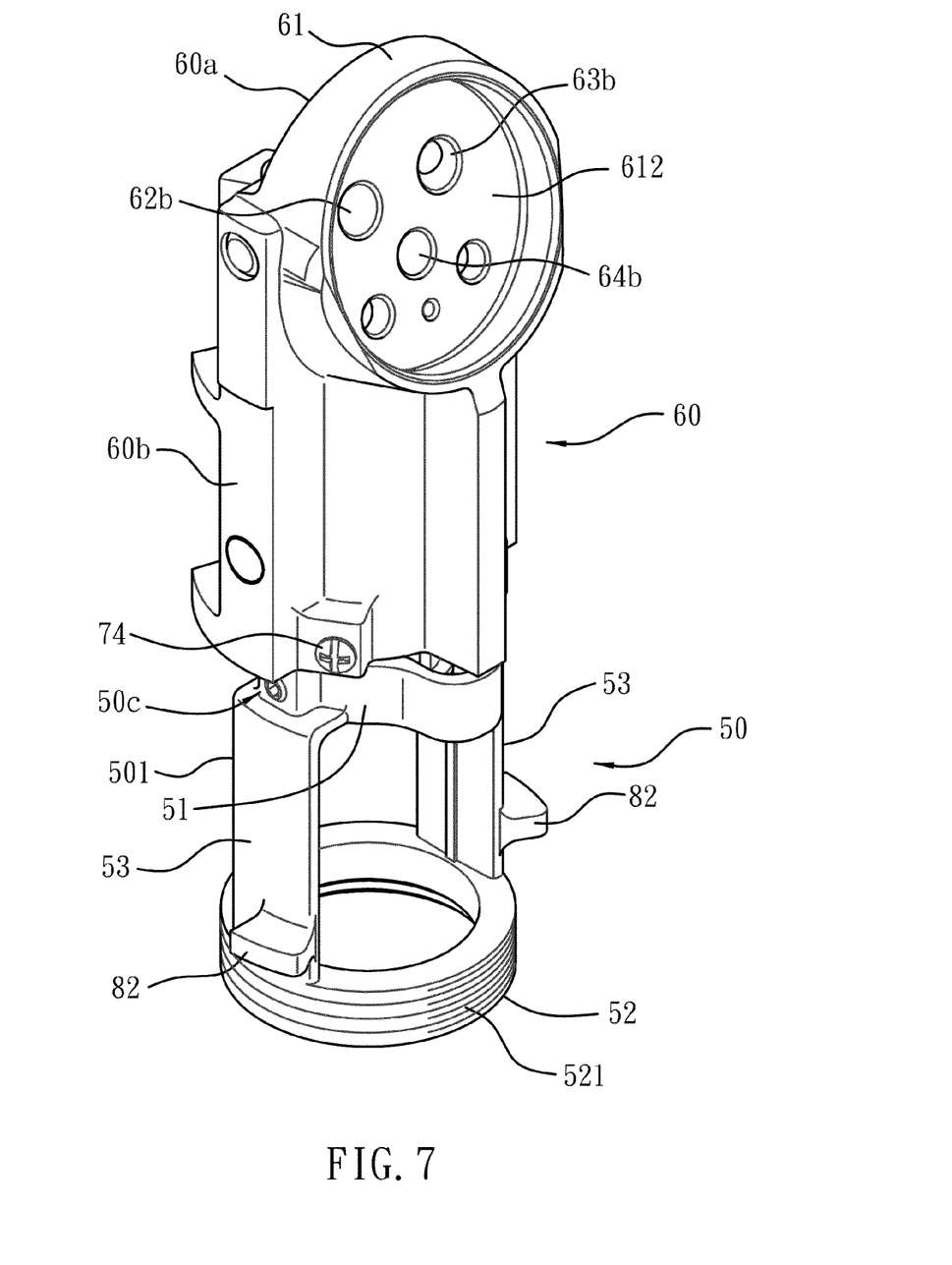
FIG. 7 is a perspective view showing the assembly of a first flowing assembly and a second flowing assembly of the single-levered rotary pulling tap in accordance with the preferred embodiment of the present invention.
Figure 11:
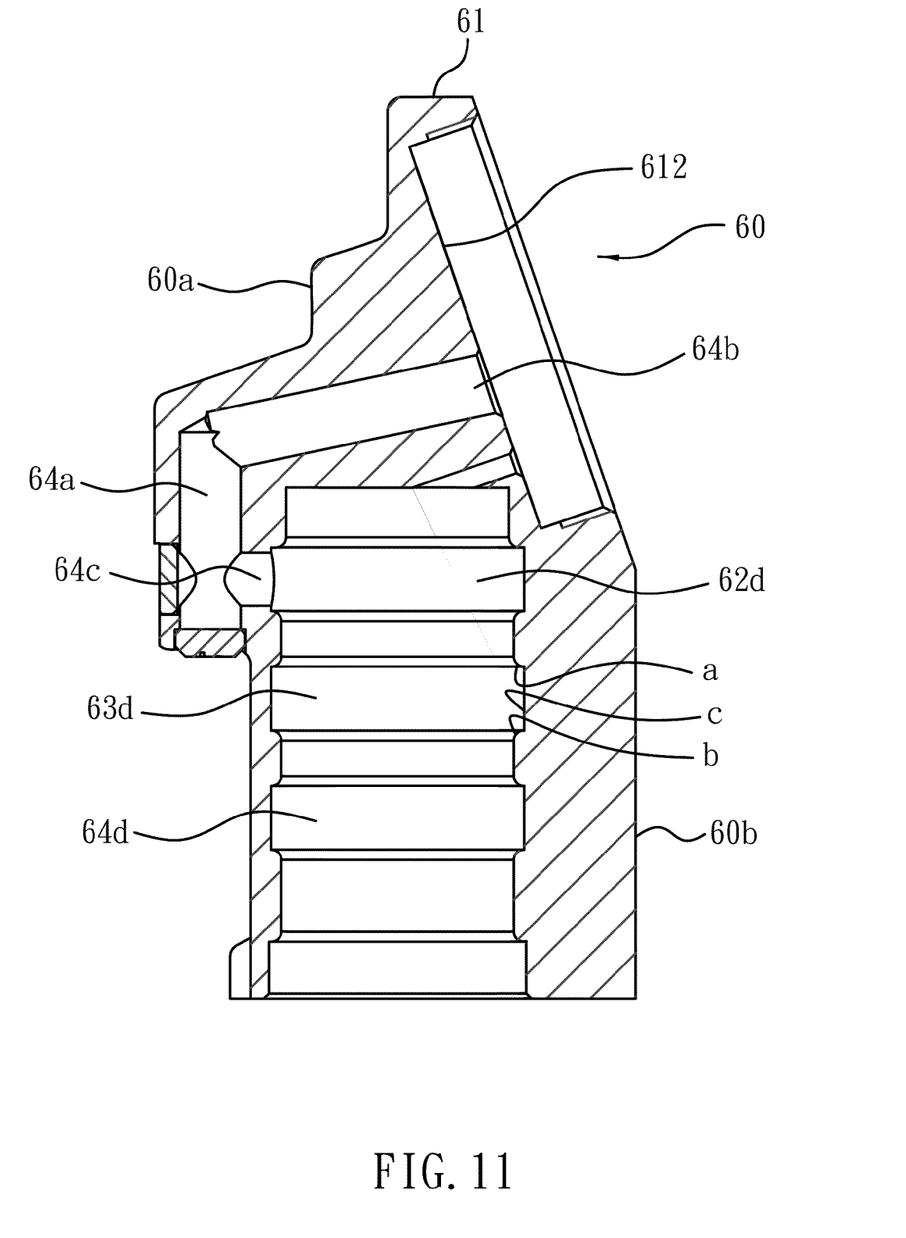
FIG. 11 is a cross sectional view showing the assembly of the second flowing assembly of the single-levered rotary pulling tap in accordance with the preferred embodiment of the present invention.

The second flowing assembly 60 as shown in FIGS. 7, 8, and 11 is located at the internal space 21 of the vertical portion 201 of the tap body 20 and includes a securing segment 60a and a bush segment 60b, both of which are integrally formed; the securing segment 60a includes a tilted end portion 61 having inner threads 611 arranged on an inner wall of the end portion 61 to screw with the outer screws 411 of the sleeve 41 of the control valve set 40 so that the second flowing assembly 60 and the control valve set 40 are securely installed on the opening 24 of the tap body 20. The bush segment 60b is movably fitted with the column portion 502 of the first flowing assembly 50 so as to rotate in relation to the column portion 502, and sealing members 58 of the column portion 502 engages with an inner wall of the bush segment 60b to prevent water from leak.

The second flowing assembly 60 includes a cold-water inflow channel 62a, a hot-water inflow channel 63a and a passage 64a respectively having a cold-water vent 62b, a hot-water ventilation 63b and an intake 64b arranged on an end surface 612 of the securing segment 60a and respectively having a cold-water orifice 62c, a hot-water orifice 63c, and an exit 64c formed on the inner wall of the bush segment 60b.

On the inner wall of the bush segment 60b are vertically provided a first slot 62d, a second slot 63d, and a third slot 64d in order relative to first, second, and third slots 54d, 55d, 56d of the column portion 502 of the first flowing assembly 50; and the cold-water orifice 62c, the hot-water orifice 63c, and the exit 64c are located at the third, the second, and the first slots 63d, 64d, and 62d individually.

The cold-water vent 62b, the hot-water ventilation 63b and the intake 64b of the end surface 612 of the securing segment 60a are in communication with the inner passageway of the valve core 42 of the control valve set 40 so that one or both of cold water from the cold-water vent 62b and hot water from the hot-water ventilation 63b flows to the inner passageway of the valve core 42 and then flows to the intake 64b.

The third, the second, and the first slots 63d, 64d, and 62d respectively include an upper periphery a, a side periphery b, and a lower periphery c as shown in FIG. 11, wherein the upper periphery a and the lower periphery c include an equal forced area such that when water flows to a chamber defined among the slots of the column portion 502 and slots of the bush segment 60b, an axial pressure generating from the actions on the upper periphery a and the lower periphery c are neutralized by each other so that relative rotations of the bush segment 60b and the column portion 502 are not stopped, hence the second flowing assembly 60 rotates smoothly on the first flowing assembly 50.

The axial defining means 70 as illustrated in FIGS. 7-9 is located between the column portion 502 of the first flowing assembly 50 and the bush segment 60b of the second flowing assembly 60 so that the bush segment 60b is axially limited to rotate at an original position. The axial defining means 70 includes a circular dent 71, a C-shaped retainer 72, two cutouts 73, and two restricting bolts 74; the circular dent 71 is fixed on an outer wall of the column portion 502 of the first flowing assembly 50; the C-shaped retainer 72 is retained in the circular dent 71; the cutouts 73 are formed on two predetermined positions of an outer wall of the bush segment 60b of the second flowing assembly 60 to be relative to the circular dent 71; the restricting bolts 74 are screwed to the cutouts 73 to engage with an inner wall of the C-shaped retainer 72 so as to generate an axial limiting function, hence the bush segment 60b fitted to the column portion 502 is axially limited on the column portion 502 to rotate.

When the C-shaped retainer 72 is forced by the restricting bolts 74, it is retained in the circular dent 71 to rotate smoothly so that the bush segment 60b rotates smoothly on the column portion 502, thus preventing from a tilted rotation to wear the sealing members 58 of the column portion 502.

Figure 5:
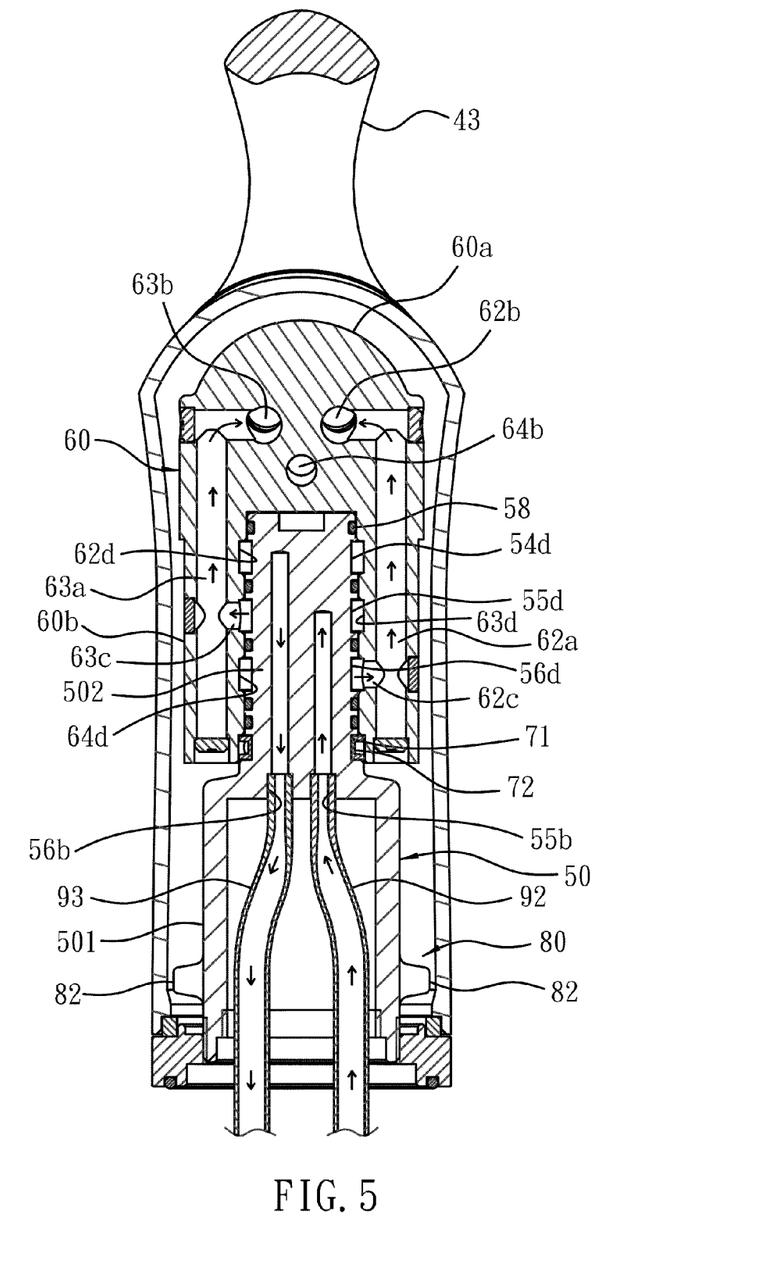
FIG. 5 is a partial amplified view of FIG. 3 and showing the operation of the single-levered rotary pulling tap in accordance with the preferred embodiment of the present invention.

The circumferential defining means 80 as shown in FIGS. 5-7 is provided to limit the tap body 20 to rotate within a predetermined angular range in relation to the base 10, and includes a rotor 81 and two stators 82; the rotor 81 extends from an inner wall of the tap body 20; the stators 82 extend from lower sides of two connecting ribs 53 of the holder 501 of the first flowing assembly 50, such that when the tap body 20 rotates relative to the base 10, the rotor 81 is limited to rotate within a predetermined angular range between the stators 82.

The predetermined angular range between the stators 82 is 90-130 degrees. Preferably, the predetermined angle is 120 degrees so that the rotor 81 is limited to rotate at 120 degrees such that the spraying head 30 of the tap body 20 is displaced rotably from one side of the water tank to another side thereof.

Figure 3:
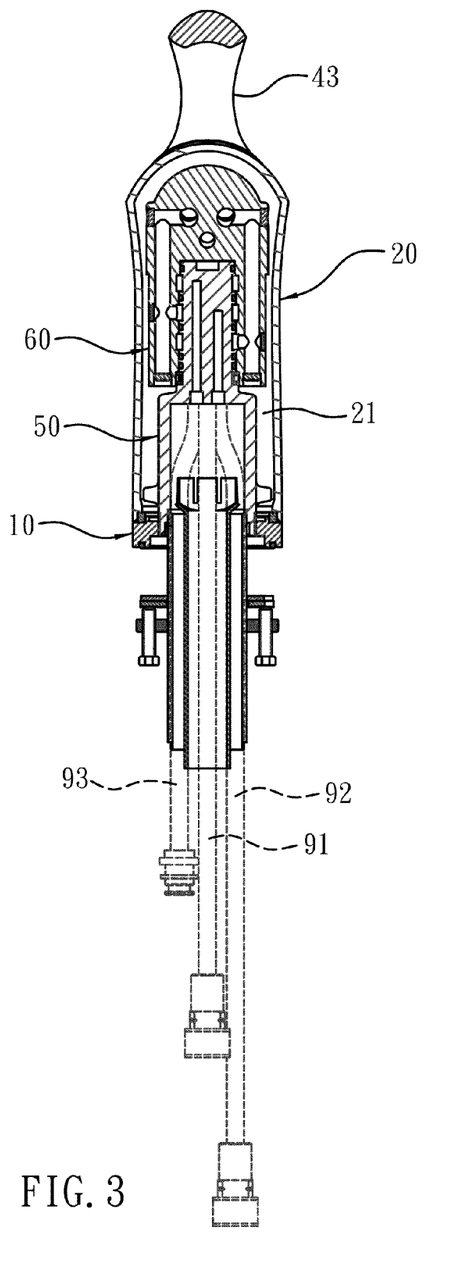
FIG. 3 is another cross sectional view showing the assembly of the single-levered rotary pulling tap in accordance with the preferred embodiment of the present invention.

The piping set 90 as illustrated in FIGS. 1-3 includes a cold-water receiving piping 91 to connect with the cold-water coupling aperture 54b of the first flowing assembly 50, a hot-water receiving piping 92 to couple with the hot-water coupling aperture 55b of the first flowing assembly 50, an outflow piping 93 to connect with the mouth 56b of the first flowing assembly 50, and a flexile hose 94, two ends of which couple with the spraying head 30 and the outflow piping 93 individually.

After the spraying head 30 is pulled outward and then released, it automatically returns to an original position by using a returning force of a spring fitted onto the flexible hose 94 or a gravity generating from a loading block on the flexible hose 94. However, these returning components are a well-known art, further remarks are omitted.

The seat 50a of the first flowing assembly 50 can fix the base 10 on the platform by using an offset tube 95 and a locking member 96 as illustrated in FIGS. 1 and 2. However, these returning structures are a well-known art, further remarks are omitted.

Therefore, user can adjustably move the spraying head 30 toward a desired position based on demand, and the pulling tap is operated smoothly to prevent from wearing related parts of the single-levered rotary pulling tap, such as the first flowing assembly 50, the second flowing assembly 60, and the control valve set 40, prolonging service life of the single-levered rotary pulling tap.

While we have shown and described various embodiments in accordance with the present invention, it is clear to those skilled in the art that further embodiments may be made without departing from the scope of the present invention.

What is claimed is:

1. A single-levered rotary pulling tap comprising
a base fixed to a platform;
a tap body including an internal space to communicate with an inlet rotatably installed to the base, an outlet, and an opening;
a spraying head movably installed to the outlet of the tap body to be pulled outward and retracted backward;
a control valve set including a sleeve to be fixed to the opening of the tap body, a valve core limited in the sleeve to rotate and including an internal passageway, and a lever to rotate the valve core;
a first flowing assembly located in the tap body and including a seat and a column portion, the seat including a cold-water inflow channel, a hot-water inflow channel, and a passage, respectively having a cold-water coupling aperture, a hot-water coupling aperture, and a mouth arranged on a bottom end of the column portion, and individually having a cold-water orifice, a hot-water orifice, and an exit fixed on an outer wall of the column portion;
a second flowing assembly located in the tap body and including a securing segment to couple with the sleeve of the control valve set and a bush segment movably fitted with the column portion of the first flowing assembly so as to rotate in relation to the column portion, the second flowing assembly including a cold-water inflow channel, a hot-water inflow channel and a passage, respectively having a cold-water vent, a hot-water ventilation, and an intake arranged on an end surface of the securing segment, and respectively having a cold-water orifice, a hot-water orifice, and an exit formed on an inner wall of the bush segment, on the inner wall of the bush segment being vertically provided a first slot, a second slot, and a third slot in order relative to the first, the second, and the third slots of the column portion of the first flowing assembly; and the cold-water orifice, the hot-water orifice, and the exit being located at the third, the second, and the first slots individually;

an axial defining means located between the column portion of the first flowing assembly and the bush segment of the second flowing assembly so that the bush segment is axially limited to rotate on the column portion;

a circumferential defining means to limit the tap body to rotate within a predetermined angular range relative to the base;

a piping set including a cold-water receiving piping to connect with the cold-water coupling aperture of the first flowing assembly, a hot-water receiving piping to couple with the hot-water coupling aperture of the first flowing assembly, an outflow piping to connect with the mouth of the first flowing assembly, and a flexile hose, two ends of which couple with the spraying head and the outflow piping individually;

wherein the axial defining means includes a circular dent, two cutouts, and two restricting bolts;

wherein the circumferential defining means includes a rotor and two stators.

2. The single-levered rotary pulling tap as claimed in claim 1, wherein the circular dent is fixed on an outer wall of the column portion of the first flowing assembly; the cutouts are formed on two predetermined positions of an outer wall of the bush segment of the second flowing assembly to be relative to the circular dent; the restricting bolts are screwed to the cutouts to generate an axial limiting function, hence the bush segment fitted to the column portion is axially limited on the column portion to rotate.

3. The single-levered rotary pulling tap as claimed in claim 2, wherein the axial defining means further includes a C-shaped retainer retained in the circular dent to engage with the restricting bolts.

4. The single-levered rotary pulling tap as claimed in claim 1, wherein the rotor extends from an inner wall of the tap body; the stators extend from a holder of the first flowing assembly, such that when the tap body rotates relative to the base, the rotor is limited to rotate within a predetermined angular range between the stators.

5. The single-levered rotary pulling tap as claimed in claim 4, wherein the predetermined angular range between the stators is 90-130 degrees.

6. The single-levered rotary pulling tap as claimed in claim 4, wherein a preferably predetermined angle is 120 degrees so that the rotor is limited to rotate at 120 degrees.

7. The single-levered rotary pulling tap as claimed in claim 5, wherein a preferably predetermined angle is 120 degrees so that the rotor is limited to rotate at 120 degrees.

8. The single-levered rotary pulling tap as claimed in claim 1, wherein the third, the second, and the first slots of the second flowing assembly respectively include an upper periphery and a lower periphery, each having an equal forced area.

9. The single-levered rotary pulling tap as claimed in claim 1, wherein between the outer wall and two sides of the column portion is defined at least one sealing member to seal the inner wall of the bush segment of the second flowing assembly.

10. The single-levered rotary pulling tap as claimed in claim 1, wherein the base includes a positioning rim disposed on a top surface thereof and having a plastic ring fixed on an outer wall of the positioning rim; and the tap body includes a retaining groove disposed on an edge thereof to engage with the plastic ring of the base.

* * * * *